UNITED STATES PATENT OFFICE.

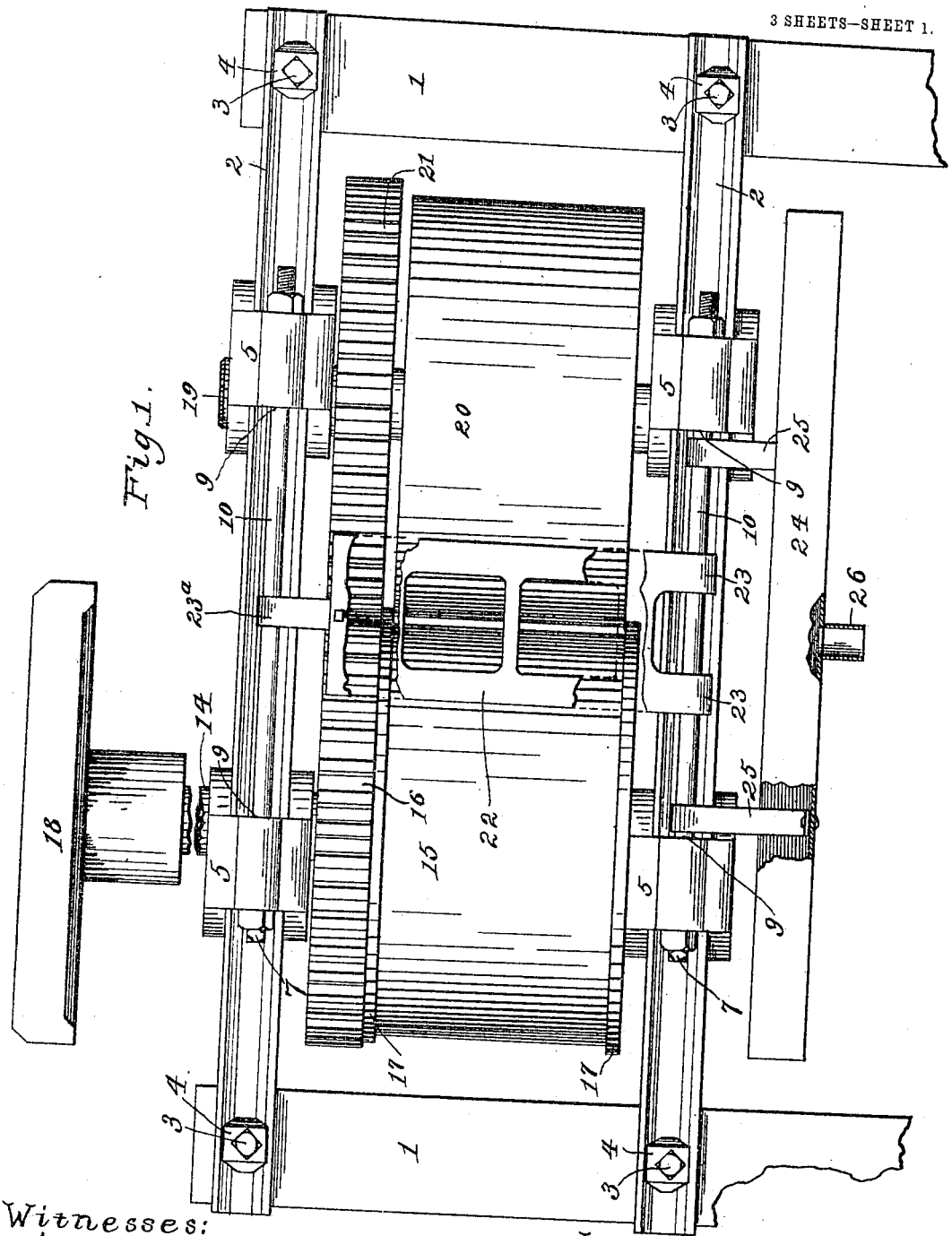

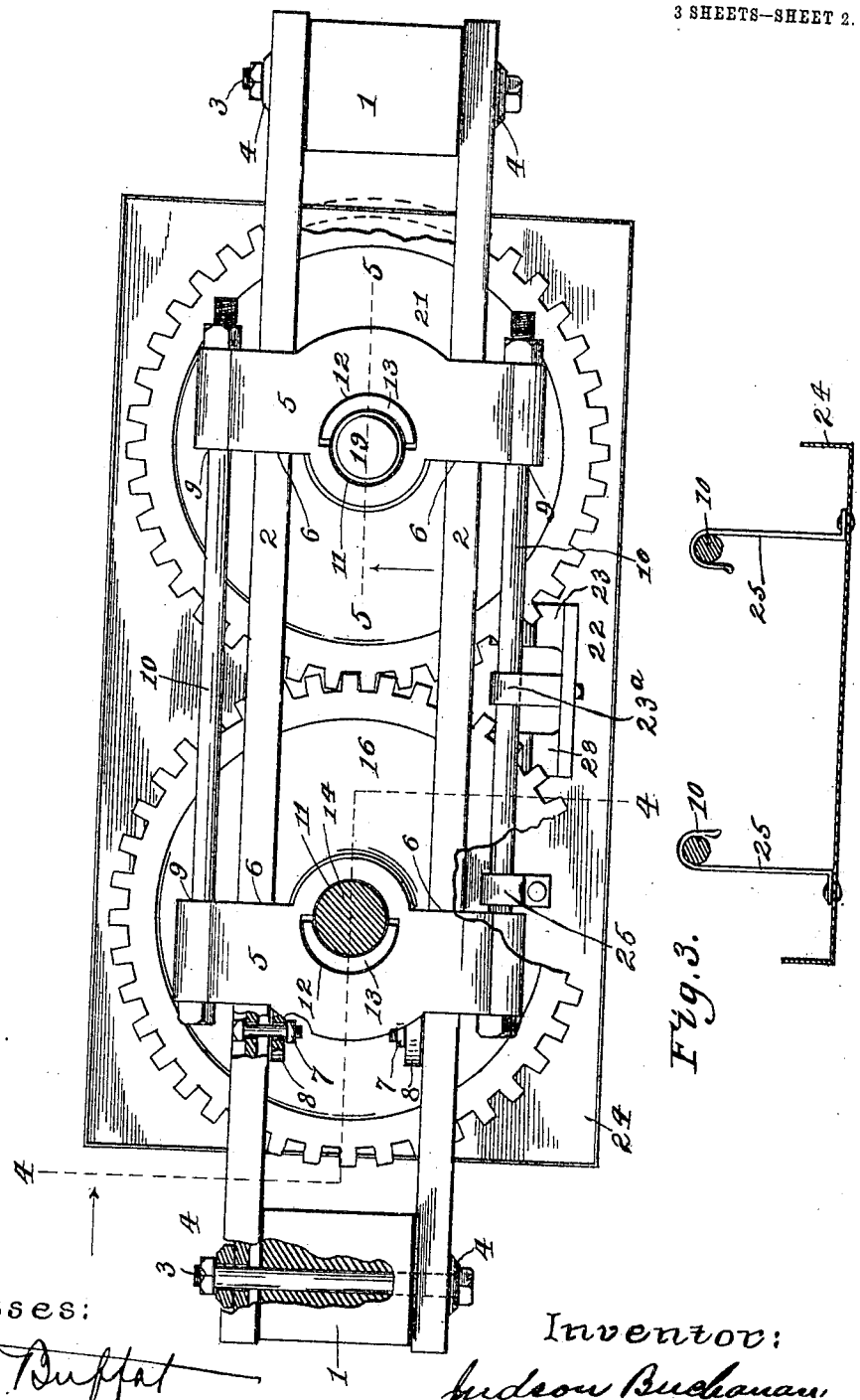

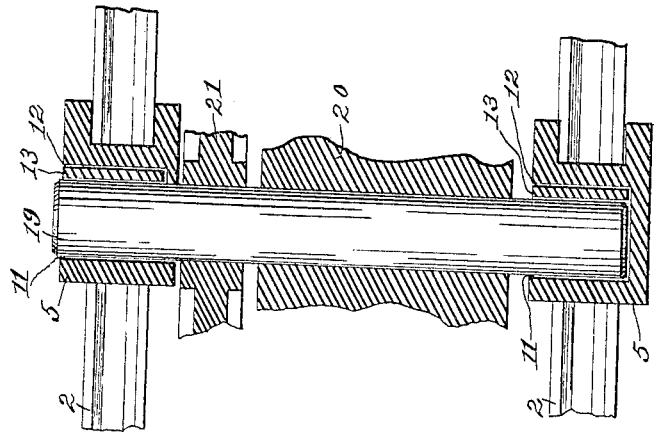

JUDSON BUCHANAN, OF CHATTANOOGA, TENNESSEE, ASSIGNOR TO CHATTANOOGA PLOW COMPANY, OF CHATTANOOGA, TENNESSEE, A CORPORATION OF TENNESSEE.

CANE-MILL.

No. 819,037.      Specification of Letters Patent.      Patented May 1, 1906.

Application filed July 24, 1905. Serial No. 270,906.

*To all whom it may concern:*

Be it known that I, JUDSON BUCHANAN, a citizen of the United States, residing at Chattanooga, in the county of Hamilton and State of Tennessee, have invented a new and useful Improvement in Cane-Mills, of which the following is a specification, reference being had to the accompanying drawings.

My invention relates particularly to cane-mills comprising two upright rolls between which the cane-stalks are crushed.

The object of the invention is to produce a mill which is light and simple in construction and at the same time adapted to perform a large amount of work.

In the accompanying drawings, Figure 1 is a side elevation of a cane-mill embodying my improvement. Fig. 2 is a plan of the same mill. Fig. 3 is an upright cross-section of the juice-pan. Fig. 4 is a section on the line 4 4 of Fig. 2 looking toward the right. Fig. 5 is a longitudinal upright section on the line 5 5 of Fig. 2.

Referring to said drawings, 1 1 are upright posts which are preferably secured by extending their lower ends into the ground. To opposite sides of said posts are secured four horizontal bars 2, said bars being arranged in horizontally-opposite pairs and joined to the posts by bolts 3, extending horizontally through said bars and said posts. Said bars are preferably composed of steel and in form they are preferably I-beams, in order that the greatest strength may be had for a given cross-section. Washer-plates 4 surround the bolts 3 at each end of the latter and rest in the outer channels of the bars 2. In the manufacture of such mills I have formed said bars out of steel plow-beam material, as shown in the drawings.

Upon each pair of bars 2 are mounted a pair of bearing-blocks 5. Each such bearing-block has a horizontal aperture 6, through which one of the bars 2 extends. The right-hand bearing-blocks 5 are slidable on said bars, while the left hand of said blocks are secured immovably to said bars by means of bolts 7, extending transversely through said bars and through ears 8, projecting laterally from said bearing-blocks. The outer end of each bearing-block is penetrated by an aperture 9, which is horizontal and parallel to the bars 2. Bolts or rods 10 extend parallel to the bars 2 and through the apertures 9 of adjacent ends of said bearing-blocks. The function of said bolts is to adjust the distance between the right-hand bearing-blocks and the left-hand bearing-blocks. Each bearing-block has an upright bearing 11 to receive one of the shafts or axles of the rolls. Each of said bearings is preferably provided with a lateral half-tubular recess 12 for receiving a half-tubular bushing 13.

The shaft 14 rests in the bearings of the left-hand bearing-blocks. Between said bearing-blocks said shaft is surrounded by the roll 15 and the spur gear-wheel 16, both of which are secured immovably upon said shaft. At its upper and lower ends said roll has annular flanges 17. At its upper end the shaft 14 extends above the upper bearing-block 5 and supports a cross-head 18, to which an ordinary sweep is to be attached for hitching one or more horses to rotate said roll.

A shaft 19 rests in the bearings of the left-hand bearing-blocks and is surrounded by the roll 20 and a spur gear-wheel 21, both secured immovably to said shaft. The length of said roll (in the upright direction) equals the space between the flanges 17, and said roll extends between said flanges. The rolls 15 and 20 are of equal diameters, and the spur gear-wheels 16 and 21 are of equal diameters and intermesh, so that when the left-hand shaft is rotated by the application of power to said cross-head the two rolls must rotate synchronously and in opposite directions, the opposing surfaces traveling in the same direction and at the same velocity.

It will be observed that by means of the bolts 10 the space between the rolls 15 and 20 may be varied.

A mouthpiece or feed-guide 22 is supported upon the front bolts 10 midway between the bearing-bocks and horizontally opposite the rolls 15 and 20. In the form shown in the drawings the lower end of said feed-guide has ears 23 surrounding the lower front bolt 10, while the upper end of said feed-guide has a metallic strap-form spring-catch 23ª, extending upward and over the upper front bolt 10. Said catch may be sprung upward and released from said bolt and the upper end of said guide swung outward and downward, the guide turning upon the lower front bolt 10. During the operation of the machine the cane-stalks are fed endwise through said guide.

A juice-pan 24 is to be secured in any suitable manner beneath the rolls 15 and 20 to receive the juice expressed from the stalks passing between said rolls. In the form shown in the drawings said pan has four sheet-metal hooks 25, rising from the bottom of the pan and extending over the lower bolts 10. This is a simple and economical construction for the support of said pan, and it permits the ready removal of the pan by springing the upper ends of the hooks laterally until they are released from the bolts. At any desired point the bottom of said pan is provided with a spout 26 for the discharge of the juice.

The bearings 11 of the lower bearing-blocks are preferably closed below, as shown in Fig. 5, in order to avoid the dripping of lubricating-oil into the juice-pan.

I claim as my invention—

1. In a machine of the nature described, the combination with two upright, parallel rolls, a bearing-block at each end of each of said rolls, horizontal parallel bars extending through and supporting said bearing-blocks, and means for supporting said bars, substantially as described.

2. In a machine of the nature described, the combination with two upright, parallel rolls and intermeshing spur-gears applied to said rolls, of a bearing-block at each end of each of said rolls, horizontal, parallel bars, extending through said blocks and means for supporting said bars, substantially as described.

3. In a machine of the nature described, the combination with two upright, parallel rolls and intermeshing spur-gears applied to said rolls, of a bearing-block at each end of each of said rolls, parallel, horizontal bars extending through said blocks, the blocks applied to one of said rolls being immovable and the others being slidable on said bars, and means for supporting said bars, substantially as described.

4. In a machine of the nature described, the combination with two upright, parallel rolls, of a bearing-block at each end of each of said rolls, bars extending through said blocks for supporting said blocks, the blocks applied to one of said rolls being bolted to said bars and the others of said blocks being slidable on said bars, and means for supporting said bars, substantially as described.

5. In a machine of the nature described, the combination with two upright, parallel rolls, of a bearing-block at each end of each of said rolls, horizontal bars extending through said blocks, horizontal bolts joining the upper of said blocks and horizontal bolts joining the lower of said blocks, and means for holding the blocks applied to one of said rolls immovably, and means for supporting said bars, substantially as described.

6. In a machine of the nature described, the combination with two upright, parallel rolls, of a bearing-block at each end of each of said rolls, the blocks applied to one of said rolls having parallel ears, parallel horizontal bars supporting said blocks, and bolts engaging said bars and ears, and means for supporting said bars, substantially as described.

7. In a machine of the nature described, the combination with two upright, parallel rolls, of bearing-blocks at each end of each of said rolls, horizontal, parallel bars extending through and supporting said bearing-blocks, means for supporting said bars, and a feed-guide adjacent to said rolls, substantially as described.

8. In a machine of the nature described, the combination with two upright, parallel rolls, of bearing-blocks at each end of each of said rolls, horizontal parallel bars supporting said bearing-blocks, means for supporting said bars, and a hinged feed-guide adjacent to said rolls, substantially as described.

9. In a machine of the nature described, the combination with two upright, parallel rolls, a bearing-block at each end of each of said rolls, horizontal, parallel bars extending through and supporting said bearing-blocks, horizontal bolts joining the upper bearing-blocks, horizontal bolts joining the lower bearing-blocks, and a feed-guide supported by two of said bars, substantially as described.

10. In a machine of the nature described, the combination with two upright, parallel rolls, a bearing-block at each end of each of said rolls, horizontal, parallel bars extending through and supporting said blocks, means for supporting said bars, and a juice-pan supported beneath said rolls, substantially as described.

11. In a machine of the nature described, the combination with two upright, parallel rolls, a bearing-block at each end of each of said rolls, horizontal, parallel bars supporting said blocks, means for supporting said bars, and a juice-pan having hook-form hangers, substantially as described.

12. In a machine of the nature described, the combination with two upright, parallel rolls, of a bearing-block at each end of each of said rolls, horizontal, parallel bars supporting said blocks, horizontal bolts joining the lower of said blocks, a juice-pan located below said rolls and having hangers engaging said bolts, substantially as described.

In testimony whereof I have signed my name, in presence of two witnesses, this 15th day of July, in the year 1905.

JUDSON BUCHANAN.

Witnesses:
JAMES K. McDOWELL,
CHARLES F. MINTURN.